United States Patent Office 3,516,813
Patented June 23, 1970

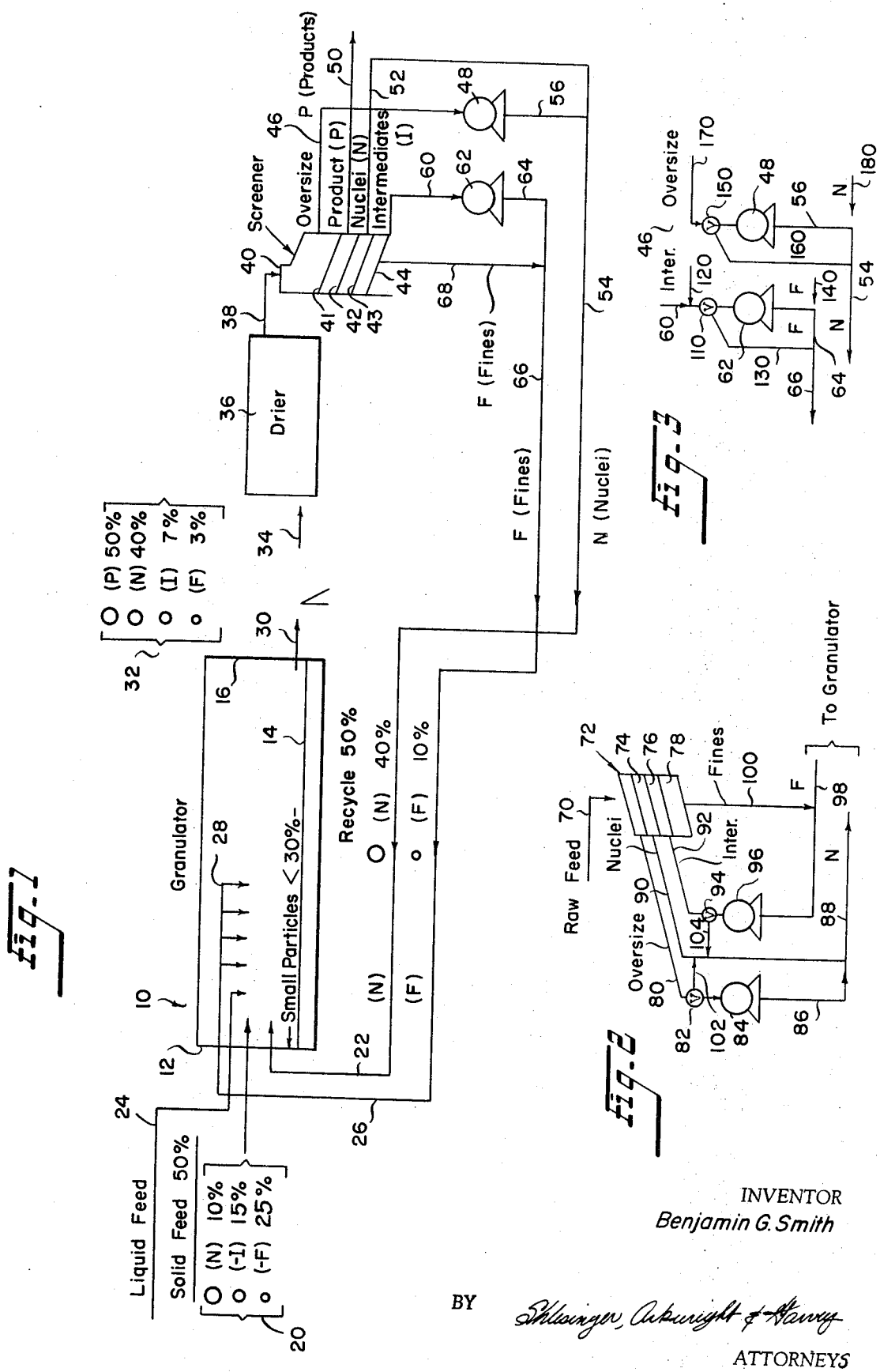

3,516,813
METHOD FOR PRODUCTION OF PELLETED FERTILIZER WITH CONTROLLED FEED PARTICLE SIZE
Benjamin Gilbert Smith, 1228 E. McMillan St., Cincinnati, Ohio 45206
Continuation-in-part of application Ser. No. 459,816, May 28, 1965. This application July 1, 1968, Ser. No. 741,724
Int. Cl. C05
U.S. Cl. 71—64                                      5 Claims

ABSTRACT OF THE DISCLOSURE

A method for producing more uniform product size fertilizer pellets in a continuous process by suppressing the percentage of smaller intermediate size granules supplied to the granulator unit, and by keeping the ratio of small unattached particles to less than thirty percent by weight of any section of the granulator bed.

---

This application is a continuation-in-part application of Ser. No. 459,816 filed May 28, 1965 and now abandoned.

SUMMARY OF INVENTION

This invention relates to a continuous process for making fertilizer pellets from feeds of conventional solids, acids, and ammoniating fluids, and more particularly to an improved method for control of product size in pellet fertilizers.

Accordingly, it is an object of this invention to provide a method of pelleting which produces a more uniform and narrow range of pellet sizes.

It is another object of this invention to provide a method for producing smoother and rounder fertilizer pellets.

It is a still further object of this invention to provide an improved granulating process which produces drier fertilizer pellets.

A still further object of this invention is to improve the "shelf-life" of fertilizer pellets.

A still further object of this invention is to provide an improved system which requires less attention and results in substantial reduction in cost.

It is a still further object of this invention to improve the efficiency of a granulator by controlling the feed particle size.

It is a still further object of this invention to improve granulating efficiency by reducing the feed of a selected subparticle size to the granulator.

It is a still further object of this invention to achieve greater uniformity of fertilizer pellet sizes produced by a granulator by changing the practice with respect to recycling of pellets outside the product range.

These and further objects of this invention will become apparent from the following description and claims, together with the accompanying drawings.

DESCRIPTION OF THE DRAWINGS

FIG. 1 is a schematic view of the process showing the flow of materials and arrangement of equipment.

FIG. 2 is a schematic view of a means for classifying materials to be fed to the granulator.

FIG. 3 is a schematic view showing an ultimate arrangement of feed and equipment for combining raw particle and recycle feeds.

DESCRIPTION OF THE INVENTION

Briefly, the invention makes use of the discovery that the feed to the granulator should include a very high percentage of nuclei sizes averaging only slightly less than minimum product size, a low percentage of smaller intermediate particle sizes ranging from approximately thirty to slightly more than seventy percent of minimum product size, and of particle sizes smaller than two-thirds minimum product size should be maintained at less than thirty percent by weight in any section of the granulator bed.

Suppression of the intermediate size particles can be accomplished by either appropriate selection and screening of raw feed materials, or by suppression of such particles in the recycled stream of particles.

Referring to FIG. 1, a rotary granulator drum 10 receives materials at its inlet end 12, to obtain an agitated or fluidized bed 14 at the bottom thereof. Preferably, the inside of the granulator has cascading flights for lifting the particles as the granulator drum rotates to thereby expedite the initial wetting of the particles adjacent the inlet end of the granulator, and to assist in drying of the particles as they approach the outlet end 16 of the granulator.

Raw solid feed, which usually constitutes thirty to sixty percent of the solid feed by weight fed to the granulator, is carried through line 18 and deposited onto the bed 14 adjacent the inlet end 12 of the granulator. An approximate percentage of particle sizes, including ten percent nuclei, 15 percent intermediate size, and twenty-five percent fines particles is illustrated at 20. Recycled nuclei size particles are also supplied to the bed 14 adjacent the inlet end of the granulator 12 through return line 22. These recycled nuclei particles make up forty percent by weight of the charge supplied to the inlet end 12 of the granulator 10. This makes possible the use of lower percentages of a liquid feed to obtain a given coating action, thus resulting in a lower moisture content in the coated particles.

Liquid feed is supplied to the granulator through line 24 to wet down the charge supplied to the bed 14 through lines 18 and 22. Preferably, a sparger is used for moistening the particles in the bed 14 as granulator drum 10 rotates.

After the bed has been moistened, the very small sized fines particles are introduced as shown in line 26 and are distributed as needed along the first half of the length of the bed 14 adjacent the inlet end 12 of the granulator. The fines particles can be distributed at various points as indicated at 28 by a conveyor means or a distributor type of arrangement using a blower.

Note that approximately twenty-five percent fines are supplied to the granulator along the line 18, while approximately ten percent fines particles are supplied by recycle along line 26. The percentage of free unattached particles, which are less than two-thirds minimum desired product size are kept below thirty percent by weight for any cross-section of the bed. The distribution of the fines along the length of the bed can be an important factor in maintaining this low percentage of free unattached small particles in cases of large percentage of fine feed. It results in a more highly fluidized or active bed while increasing the coating action of the smaller particles onto the nuclei sizes.

The coated particles are passed out of the granulator along line 30, and have an approximate particle distribution as shown at 32. Note the high percentage of product particle sizes and of nuclei sizes in the output. This is true for all feed particle distribution in accordance with this invention.

The output is subsequently fed continuously along line 34 to drier unit 36 for final drying of the product, after which the product is conveyed along line 38 to the screener unit 40.

The screener unit shown has four screens, 41, 42, 43 and 44, which respectively divide the incoming product particles into streams of oversize, product size, nuclei size, intermediate size, and fines particles. The oversize particles are taken from screen 41 and passed along line 46 to a pulverizer unit 48. The product size particles pass through the screen 41, but are collected on screen 42 and are taken out from the screener along line 50 for bagging. The nuclei size particles pass through screen 42, but not screen 43; these particles are taken from the screener unit as shown along line 52 which connects with the nuclei recycle line 54. Note that the pulverized particles passing through pulverizer 48 are fed to nuclei recycle line 54 along line 56.

The undesired intermediate size particles pass through screens 41, 42, and 43, but not screen 44, from where they are withdrawn and passed along line 60 to pulverizer 62. Pulverizer 62 reduces the intermediate size particles to fines size particles which flow along line 64 to fines recycle line 66. The fines particles introduced to screener unit 40 pass through all four screens and are dropped along line 68 onto the fines recycle line 66.

The particles are moved in most instances from one unit to another and along the lines shown by conveyors. In several instances, such as the feed line 38 from the dryer to the screener, or the feed of fines size particles along line 68, it may not be necessary to use a conveyor, but may be possible to arrange the units such that the particles can drop from the dryer to the screener, or from the screener to the fines recycle line without using a conveyor.

Note that at 18 fifty percent of the feed to the granulator is recycle material, and that forty percent is nuclei sized particles while the remaining ten percent is fines sized particles. The suppression of the amount of intermediate sized particles is extremely important in obtaining better granulating action. The suppression of intermediate sized particles can be accomplished, as shown in FIG. 1, by pulverizing the intermediate size particles in the recycle line, or in providing better screening of the incoming raw feed to the granulator.

In the process shown in FIG. 1, the particle sizes are as follows:

Product—3.0 to 2.2 mm. in diameter.
Nuclei—2.6 to 1.7 mm. in diameter.
Intermediates—1.7 to 0.7 mm. in diameter.
Fines—Less than 0.7 mm. in diameter.

It is important that the granulator feed including raw feed and recycle feed be maintained at no less than fifty percent by weight of particles in the size range between 1.7 mm. and 2.6 mm. in diameter. Note that the larger size of 2.6 mm. in diameter for the upper limit of the nuclei sized particles is greater than the minimum product diameter size. This is due to the presence of some product size in the raw feed. However, the bulk of the nuclei size, specifically, the range between 2.0 to 2.6 millimeters in diameter should be maintained at greater than forty percent by weight.

It is also essential that the percentage of free unattached small particles (those smaller than 1.4 millimeters in diameter, or approximately two-thirds the diameter of the minimum product size) be kept at less than thirty percent by weight for any section of the granulator bed. If necessary, the feed of fines particles can be distributed over the first half of the length of the granulator bed to accomplish this.

As mentioned above, it is essential that the intermediate size particles ranging from 0.7 to 1.7 millimeters in diameter (approximately one-third to three-quarters of minimum product size) be restricted in the feed to the granulator. This is accomplished either by pulverizing a portion of the intermediate sizes in the recycle feed, pulverizing the intermediate sizes in the raw solid feed, or in a combination of both methods. During the coating action in the granulator, the intermediate size particles use a large percentage of fines, drawing off the fines available for coating of nuclei-sized particles, but do not build up sufficiently on the average to produce product size particles. Therefore this brings about the undesirable results of low percentage of product size, increased volume of recycled material, and a smaller average product size.

It may be desirable to remove excess moisture from the particles while they are in the drum. This is accomplished by showering the particles through warm air in the granulator drum as they approach the far end 16 of the granulator. The cascading flights on the inside of the granulator drum, which lift a higher percentage of granules up along the granulator sides result in a showering of pellets through the drying air to remove excess moisture.

A control of desired product size can also be accomplished by proportioning the weight of small particles which are less than 0.7 millimeter in diameter (one-third minimum product size) to the weight of nuclei size particles in the raw feed, in accordance with required growth to reach final product size.

The recycle nuclei particles supplied to the granulator from lines 54 and 22 are relatively large sized, being approximately 2.0 to 2.6 millimeters in diameter.

In FIG. 2, an arrangement is shown for processing the raw feed into the desired particle sizes. The line of raw feed 70 is fed into screen 72 which has screens 74, 76 and 78. Oversize particles from screen 74 are fed along line 80 through distributing valve 82 and into the pulverizer 84. The pulverized particles are fed from pulverizer 84 along line 86 into line 88 which feeds to the granulator.

The nuclei sized particles are removed from screen 76 and follow line 90 down to granulator nuclei supply line 88. The intermediate sized particles are removed from screen 78 and carried along line 92 through distributing valve 94 to fines pulverizer 96. The fines particles leaving pulverizer 96 are carried along fines supply line 98 to the granulator.

The fines particles passing through the screener 72 pass along line 100 to line 98 for delivery to the granulator.

The oversize particle flow control valve 82, and the intermediates flow control valve 94 provide some versatility in changing the relative percentages of different particle sizes supplied to the granulator. Oversize particles can be moved along line 102 from control valve 82 directly to the nuclei supply line 90. Similarly, a portion of the intermediate particle flow to the pulverizer 96 can be diverted by intermediate flow control valve 94 to line 104 for direct carrying of some or all of these particles to the granulator through lines 90 and 88.

FIG. 3 shows an arrangement where the two pulverizers 62 and 48 of FIG. 1 can be used with the screener 72 of FIG. 2 to provide for pulverizing of both the raw feed and the products to be recycled.

This is accomplished by inserting a valve or other type of flow control means 110 in the intermediate recycle feed line 60 before pulverizer unit 62. A bypass line 130 is connected between the intermediate bypass flow control valve 110 and the fines particles recycle line 66. The raw fines from the screener are directly conveyed along line 140 into fines recycle line 66.

Similarly, an oversize particle bypass valve 150 is inserted in the oversize particle supply line 46 upstream of the pulverizer unit 48. An oversize particle bypass line 160 connects the oversize particle bypass valve and the recycle nuclei particle supply line 54. The oversize particles from the raw feed screener are fed along line 170 and connected to either line 46 or the bypass valve 150. The nuclei size particles from the raw feed screener are carried therefrom along line 180 which is directly connected to the nuclei recycle feed line 54 of the FIG. 1.

With this arrangement pulverizing of both the raw and recycle intermediate and oversize particles can be accomplished with two pulverizer units, instead of four such units if close particle control is desired in both the recycle and raw fed streams. The bypass valves or distributor means provide for variance of particle supply fed to the granulator as desired.

Referring again to FIG. 1, it should be noted that the distribution of fines along the granulator bed can be accomplished by either a conveyor or by a blower, both of which would perform satisfactorily in maintaining the percentage of unattached smaller particles at less than thirty percent by weight for any given bed cross-section.

The essential part of the invention is maintaining the bed in a highly granular or fluidized state. The particles in the granulator bed each move independently although being wetted and undergoing chemical reaction. This result is received by limiting the amount of free and unattached particles of less than nuclei size as mentioned above. Under these conditions the bed is highly active, and promotes good dispersion of the liquids throughout the bed presenting a larger surface area of nuclei particles for chemical reaction and coating of fine materials.

Basically, the pellet is formed by the coating action of fine particles on nuclei particles several magnitudes larger. This action is superior to agglomeration wherein a relatively few number of pellets are formed from a large number of particles by wetting the mass to a plastic state and rolling to a final spherical form. Such a process will produce pellets having diameters several times larger than the average raw feed.

In this invention, the pellets are produced by a highly active coating. It has been found that the pellets grow primarily through the accretion of coating material rather than from an agglomeration of fine particles. As a result the range of moisture percentages is not so sensitive as would be the case in agglomeration. For example, the process of FIG. 1, successful pelleting can operate over a wider range of moisture fed to the granulator, where a mixture granulating at 3.5 percent moisture can effectively be pelletized at from 3.0 to 4.5 percent moisture. Also, the pelletized product will be drier for a given percentage of moisture, resulting in less heat required with its consequent savings in fuel cost.

The pelleting action of the subject invention also results in greater control of the product size because of the nuclei size is a determining factor in the resulting product size taken from the granulator, as contrasted with the random distribution resulting from the agglomeration type of action that is more characteristic of prior granulating methods.

With regard to the nuclei particles, it has been found that the surface characteristics are of importance and that the nuclei surface should be hydrophylic with respect to the liquid phase in the granulator. That is, the liquid phase interaction on the nuclei particles should allow for only some surface deformation. Under these conditions, good binding with a smaller coating size materials is enhanced. Nuclei particles should be relatively impermeable to internal absorption of the liquid phases present in the granulator unit. That is, a particle of nuclei size to act as a good nuclei, must not absorb liquid phases too quickly. If this absorption occurs in the ammoniation-granulation stage, or the early stage of drying, the nuclei particle is likely to lose its discrete character and either form unwanted oversize particles or interfere with the highly desirable fluidized characteristics of the granulator bed.

To obtain a good spheroidal shape for the resulting product, both the degree of coating and the shape of the nuclei particles are important if the degree of coating is relatively small, the products approach to spherical form will be dependent on the shape of the nuclei. If however, the amount of coating is relatively large, the shape of the nuclei is not so important.

As we have noted previously, the essential criteria for a good coating action in the granulator depends upon the large difference in size between the nuclei particles and the coating material. This is the object in suppressing the amount of intermediate size particles fed to the granulator. Accordingly, the fines introduced to the granulator as described in FIG. 1 are less than 0.7 millimeter in diameter, while the nuclei particles are greater than 1.7 millimeters in diameter with the bulk of the nuclei particles being in the size range of between 2.0 to 2.6 millimeters in diameter. Note that the maximum nuclei size is greater than the minimum product size.

To effectively bring about a coating action it is important that the coating particles constitute only a small portion of the active coating bed, and that they should constitute less than thirty percent by weight in any given bed cross-section, and should be preferably about ten percent.

The coating material should have good dispersability in the fluids and under pelleting conditions in the granulator. This generally means that the fine materials, either under conditions of chemical or solvent action, or because of finer particle size should have a significant quantity of very fine (one hundred micron) materials.

The size of the pellets obtained from the granulator depends, as mentioned above, upon the nuclei size. The balance between the coating material and the number and size of nuclei can be controlled to give larger pellets by finely pulverizing the intermediate size particles of the recycle, as illustrated in FIG. 1.

It can also be controlled by changing the average nuclei size obtained from the solid raw feed by appropriate screening, as illustrated in FIG. 2. Increase in the average nuclei size will tend to increase the product or pellet size from the granulator.

Another means of controlling the product pellet size is by varying the nucleating index of the solid raw feed. This is defined as the quantity of adequate nuclei that is supplied by the feed material. It is the sum of the particles of appropriate size and characteristics that pre-exist in the feed and the number of particles that are formed by incipient agglomeration in the first pass through the granulator unit. An increase in this nucleating index decreases the pellet size and increases the recycle of the system.

Changes in the relative amount of liquid phase in the granulating zone does not change pellet size, but only affects coating efficiency. Consequently, a wider range of liquids will be acceptable without affecting pellet size and the amount of products recycled.

The amount of recycled material is also important since it is possible to overload the recycle system of the plant and possibly cause shutdown. To avoid this, the solid raw feeds should not have a large nucleating index, since they will tend to produce a surplus of nuclei which will overload the recycle system. This condition will usually occur where the solid raw feeds have a high nucleating index and have a relatively small nuclei size. The problem can be corrected by pulverizing the intermediate size particles in the recycle, decreasing the nucleating index of the solid raw feed, or by increasing the average nuclei size of the solid raw feed.

The liquids distributed on the bed are ammonia and aqueous solutions of ammoniating liquids and acids. FIG. 1 contemplates application of liquids upon or within the free surface of the granulator bed by a conventional type sparger. The wet effluent pellets after leaving the granulator drum pass to the dryer, which is of conventional design, where they are dried to the final desired product moisture. It is possible to cool the pellets after they leave from the dryer by conventional means, if desired, instead of going directly through the screener unit.

FIGS. 1 to 3 are shown to clearly illustrate the principles of this process. A typical installation may or may not include separate conveyor lines 54 and 66 for recycled nuclei and fine particles, may eliminate screen 44 and send both the dried fines and intermediates through the pulverizer together or may eliminate the distributor 28 within the granulator where the total fines feed is less than thirty percent.

While the invention has been described in connection with different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and fall within the scope of the invention or the limits of the appended claims.

What I claim is:

1. In the method of producing pelleted fertilizer which includes the step of introducing fertilizer particles of fine, intermediate, and nuclei sizes to a rotating granulator, adding aqueous solutions of acids and ammoniating liquids to the bed of particles introduced to the granulator, and drying the coated particles to produce the desired fertilizer pellet size, the improvement which comprises:
   (a) introducing nuclei sized particles to the granulator to make up not less than fifty percent of weight of the solid feed material, said nuclei sized particles being approximately three-quarters to one and one-quarter minimum product sized;
   (b) controlling the percentage of intermediate sized particles in the solid feed to the granulator, such particles being from one-third to three-quarters minimum product diameter, so that the percentage of such particles is several magnitudes less than the percentage fo fines particles, the latter particles being less than one third minimum product size;
   (c) distributing the fines particles to the granulator bed so that the amount of free unattached particles, those particles being less than two-thirds minimum product size, are by weight less than thirty percent for any section of the granulator bed, whereby the fluidity of the bed is increased and a high percentage of product sized pellets are produced.

2. The method of producing pelleted fertilizer as set forth in claim 1, comprising:
   (a) recycling to the granulator only nuclei and fines particles, the percentage of nuclei sized particles being greater than twice the percentage of fines particles.

3. The method of producing pelleted fertilizer as set forth in claim 1, comprising:
   (a) supplying a feed size to the granulator having greater than fifty percent by weight of nuclei sized particles, more than forty percent of such particles being in the upper two-thirds of the nuclei size particle range.

4. The method of producing pelleted fertilizer as set forth in claim 1, comprising:
   (a) screening and subsequently pulverizing intermediate sized particles to produce fine sized particles in order to control and suppress the percentage of intermediate sized particles in the feed to the granulator.

5. The method of producing pelleted fertilizer as set forth in claim 1, comprising:
   (a) showering the coated fertilizer pellets in the granulator through warm air passed through the granulator drum to remove excess moisture.

References Cited
UNITED STATES PATENTS 2,963,359   12/1960   Moore et al.     71—64
2,965,472   12/1960   Huxley et al.     23—313 X HOWARD R. CAINE, Primary Examiner U.S. Cl. X.R.

23—313